UNITED STATES PATENT OFFICE.

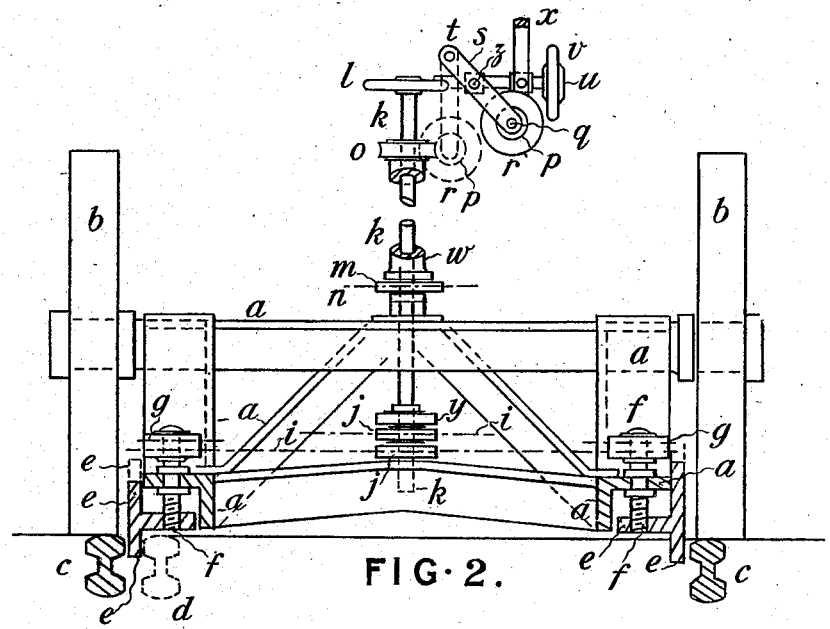
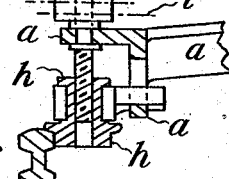
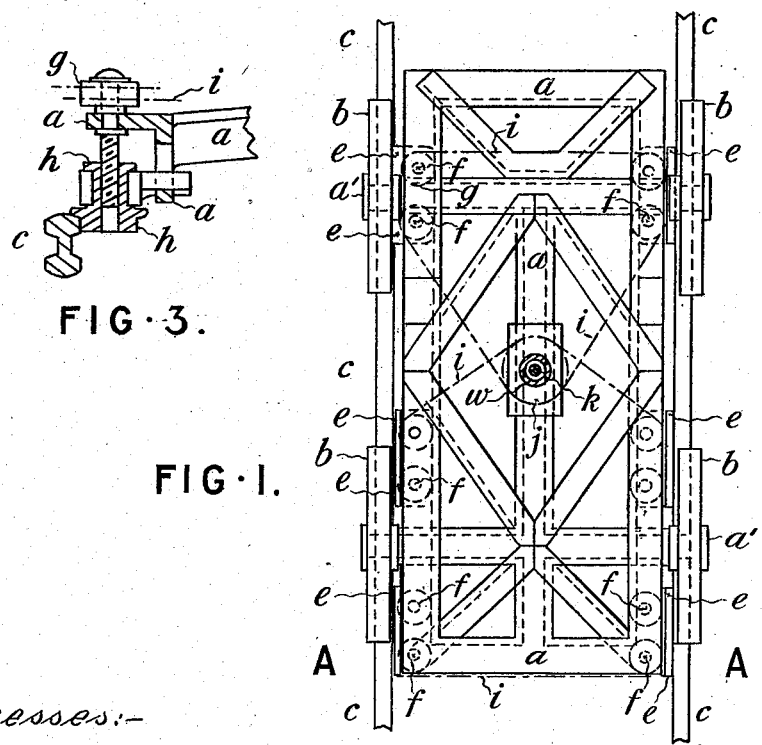

ROBERT COOKE SAYER, OF REDLAND, BRISTOL, ENGLAND.

VEHICLE FOR RAILWAYS AND ROADS.

No. 901,194.

Specification of Letters Patent.

Patented Oct. 13, 1908.

Application filed August 1, 1907. Serial No. 386,647.

*To all whom it may concern:*

Be it known that I, ROBERT COOKE SAYER, a subject of the King of Great Britain and Ireland, and resident of 11 Clyde road, Redland, Bristol, England, have invented certain new and useful Improvements in Vehicles for Railways and Roads; and I do hereby declare the following to be a full, clear, and exact description of the invention, such as will enable others skilled in the art to which it appertains to make and use the same.

My invention relates to railway vehicles, and particularly to that type which are adapted to travel over rails, or over highways.

The object of the invention is to enable the vehicles to run over rails or roads by the substitution of wheels without flanges for those at present with flanges to guide them on the rails they traverse.

Broadly speaking the invention consists in the embodiment of flangeless wheels with gage slide guides, or friction wheels separate from the supporting wheels, and carried upon a frame so as to be adjustable whereby they may be moved from below the level of the supporting wheels so that the vehicle may run upon the highway.

The object is attained as set forth in the following specification and drawings where, Figure 1 is a plan view showing the invention attached to a bogie truck adapted to carry one end of the vehicle. Fig. 2 is a sectional elevation at *a—a* of Fig. 1. Fig. 3 is a detailed section showing a modification.

A indicates a bogie truck, frame or platform, and *a'* the axles thereof upon which are mounted the wheels *b* without springs to run on rails *c, d* being check, or the flangeless wheels *b* are carried on by flanges *e*, having pinions *g*.

carrying the other end of the vehicle. Both bogies have a tube *w* attached outside the rod *h* with a pinion *m* connected by a chain *n*, to drive its fellow at the other end of the vehicle. A wheel *o* is secured to the top of the tube and is adapted to be driven by a worm wheel *p* mounted on a pivot pin *q* journaled in the ends of links *s* adapted to center at *t* when traversed by a trunnioned nut *z* carried on the link *s* which is operated in screw bolt *u*. This bolt is mounted in trunnion bearing *x* and is rotated by a handle *v* from the full line to the dotted position, to engage the wheel *o*. The bearings and *x* are carried so as to allow the tube *w* the vehicle to bogie round the device is as follows:

The operation of the device traverses the rails *h* F. When the vehicle Figs. 1, 2, or wheels to its flanges *e* the positions shown, the former to tween the rails *c, d* and keep the on the rails *c*. When a vehicle *l* ar rails *c* for a road the handle *v* to screw t *i, y, i, g, f* are actuated to slide upon the screw bolts *f*; to frame *a*, to the dotted position above the rails *c*, at both ends the handle *v* and screw *u* are t over the links *s*, the rod *q*, a *p* to engage the wheel *o*. *w, m, n* are rotated to turn and its wheels *b* in oppo steer and run them from road surface.

Having thus described I claim and desire to s ent is:—

In a device of the porting frame, tracti by, a pair of rails wheels are adapted in said frame, flan for engaging the thereon, pinions tating means, tween the rotat